United States Patent [19]

Giacobbe

[11] Patent Number: 5,066,421
[45] Date of Patent: Nov. 19, 1991

[54] HEATING AND PRODUCING A HYDROCARBON STEAM MIXTURE

[75] Inventor: Francesco Giacobbe, Rome, Italy

[73] Assignees: Mannesmann AG; Kinetics KTI Group BV, both of Fed. Rep. of Germany

[21] Appl. No.: 281,107

[22] Filed: Dec. 7, 1988

[30] Foreign Application Priority Data

Dec. 7, 1987 [IT] Italy ................................ 48681 A/87

[51] Int. Cl.$^5$ ................................................ C01B 3/32
[52] U.S. Cl. .................................... 252/373; 48/198.1; 261/128; 165/2
[58] Field of Search ......................... 252/373; 48/198.1

[56] References Cited

U.S. PATENT DOCUMENTS

| 3,441,393 | 4/1969 | Finneran et al. | 252/373 X |
| 3,971,847 | 7/1976 | Houseman | 252/373 |
| 4,640,690 | 9/1987 | Andrew et al. | 252/373 |

Primary Examiner—Howard T. Mars
Attorney, Agent, or Firm—Ralf H. Siegemund

[57] ABSTRACT

A reforming process for the production of hydrogen or synthesis gas is improved by a preparatory process including the preheating of gaseous hydrocarbons within a heat exchange zone into which water is sprayed to obtain concurrently evaporation of water and preheating of the water vapor as well as mixing of the hydrocarbon gases being preheated with the steam as produced, and preheating of the entire blend will continue prior to charging the reformed process.

12 Claims, 2 Drawing Sheets

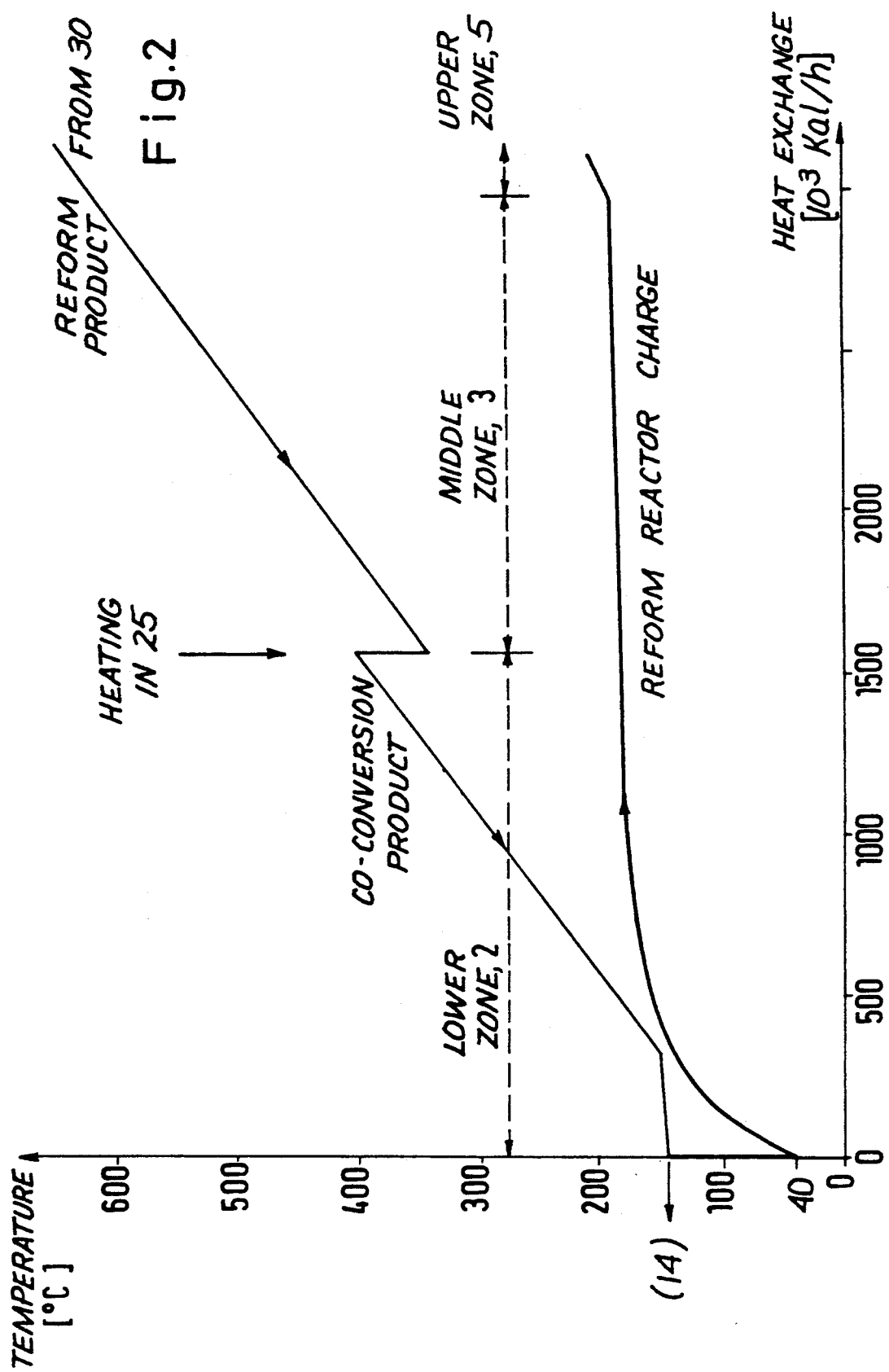

HEATING AND PRODUCING A HYDROCARBON STEAM MIXTURE

BACKGROUND OF THE INVENTION

The present invention relates to the continuous production and preheating of a hydrocarbon-water vapor or steam blend and mixture to be used as a charge in a reforming process ultimately for the production either of hydrogen or of synthetic gas, being the reform product. Moreover, the invention relates to the construction of a particular heat exchanger for purposes of carrying out this method.

It is known generally to produce hydrogen or a synthetic gas rich in hydrogen in a reformer reactor which includes a suitable catalyst and under utilization of a mixture of hydrocarbon such as methane and water vapor. The hydrocarbon-water vapor blend is heated to a temperature of about 400 to 500 degrees C. and pressurized up to 40 bar and in that stage fed to the reactor. The temperature of that change is increased in the reactor to 750-900 degrees C., depending on the pressure, and now for instance hydrogen gas is produced. The particular reaction carried out in the reactor is endothermic and thus requires a supply of thermal energy. In the case of methane as the hydrocarbon the following equation obtains:

$$CH_4 = H_2O \rightleftharpoons CO + 3H_2$$

The hydrogen content depends on the excess of the water vapor that is fed into the system as part of the blend or mixture but also on the temperature and pressure in the reforming reactor. If the water vapor excess increases and if the temperature increases the gain in hydrogen is likewise increased while on the other hand an increase in pressure reduces the hydrogen production under otherwise similar circumstances. Depending on the reaction conditions and the excess in water vapor one therefore obtains a hydrogen rich gas which however includes in addition CO and $CO_2$ possibly also excess water that has not reacted and a certain residue of not reacting methane. This amount of residue generally is again larger the higher the pressure and lower the reforming temperature.

The industrial production of hydrogen and synthetic gas is usually carried as a reaction in vertically arranged pipes or tubes which contain the catalyst and which dip into the radiation zone of the furnace. Owing to the high reforming temperature the thermal efficiency in that radiation zone is quite low. One uses approximately 45 to 60% of the thermal energy that is produced by combustion in the furnace. Assuming that the CO production is not of any interest one can provide for a supplementary reaction in a downstream reactor under utilization of a different catalyst and in accordance with the reaction equation:

$$CO + H_2O \rightleftharpoons CO_2 + H_2$$

Owing to this reaction further excess water is used while on the other hand the gain in production is indeed increased. This particular reaction is an exothermic one, and the equilibrium condition is quite independent from pressure. The degree of completeness of the conversion of CO from $H_2$ and $CO_2$ increases with a decrease in the conversion temperature. Depending on the catalyst used the conversion temperature is about 350°-450° C. or from 200°-250°. Accordingly the reforming product has to be cooled down prior to the CO conversion to a temperature of about 350° or 200° C. It follows from the foregoing that the heat content in the combustion gases of the furnace as well as in the reforming product is quite high, owing to the low thermal efficiency of the device. The same is true with regard to the amount of heat that is produced during the CO conversion. These combined heat values exceed the requirement for the production of steam as well as for the preheating of the charge of the reformer being the hydrocarbon; the charge water vapor mixture. In order to avoid loss of this excess in heat content it is used, if the equipment so permits, to produce an additional amount of steam which is then discharged in one form or another from the equipment. Such a supplemental steam production and discharge is of course meaningful only if there is a consumer and user for that steam. If not then a recent development comes into play, namely a regeneration reformer was available in which a part of the heat content in the reformed product is used directly in the reformer reaction. That in turn permits some reduction in the amount of heat which remains unused in the radiation zone.

It can readily be seen that claiming and regaining of heat in the reforming device is a multilevel complex problem. It covers broadly the preheating of the hydrocarbons, the production and superheating of steam and the preheating of the hydrocarbon-water vapor mixture. These multiple requirements entail the utilization of separate heat exchanger types which are interconnected for tubing for conduction of the various fluids heating and media to be heated. All this is very expensive.

DESCRIPTION OF THE INVENTION

It is an object of the present invention to provide a new and improved supplemental product for processes and equipment involving hydrocarbons and which makes better use of the heat that is being developed during operation such that the equipment expenditure can be reduced particularly bearing in mind the production and preheating of a hydrocarbon-steam mixture.

It is therefore a specific object of the present invention to provide a new and improved method for continuous production and preheating of a hydrocarbon-water vapor blend as a charge for a reforming process ultimately for the production of a hydrogen containing gas such as a synthesis gas.

It is another object of the present invention to provide a new and improved heat exchanger for use in the continuous production and preheating of hydrocarbon-water vapor blend as it is being used in a reforming process for the production of H and synthetic gas.

In accordance with the preferred embodiment of the present invention it is suggested to provide for the preheating of the hydrocarbons, the production of steam and for further heating of the hydrocarbon-steam blend in a single heat exchanger wherein the heat medium is separated through partitions from the respective fluid (hydrocarbon-water-steam) and that the water to be used for the production of steam is sprayed into a heat exchanger in liquid form and that simultaneously with evaporation that water is brought in contact with the stream of hydrocarbons which is also fed into the heat exchanger. As far as the heat exchanger is concerned, it is suggested to provide at least four vertically stacked zones which are interconnected for purposes of being passed through by the fluid to be heated. The lowest one of these zones is constructed as a precipitator and is connected for extraction of a slurry. A heat exchange zone is provided above the precitpitator and into which gaseous hydrocarbons are fed from below and through a conduit which is connected to the precipitator or directly to the heat exchange zone itself. A water spray zone is provided above a lower heat exchange zone to spray water into the rising hydrocarbon steam blend and an upper heat exchange zone is provided in which the mixture of hydrocarbon and steam is further heated and from which it can be extracted as a charge.

The basic underlying concept of the invention is the utilization of a single heat exchanger combined with the preheating of the hydrocarbon feed, the production and superheating of steam itself as well as the production and heating of the mixture. Here the process of heating hydrocarbons and the production of steam, the saturation of steam, the saturation of the hydrocarbon with steam and further heating of the hydrocarbon-steam blend are all carried out more or less simultaneously in a continuous process whereby at the exit of the heat exchange device as a whole a preheated hydrocarbon-water vapor or steam blend can be extracted having the desired consistency. The heat needed for preparing the preheated hydrocarbon-steam blend is essentially produced from the heat content of the reformed product as it has been produced including the heat content and the utilization of the heat of the reformed discharge slurry. Should a CO conversion be included then the resulting heat can likewise be used; it is remarkable that the heat content of the slurry resulting more or less from the water steam production can be utilized for the preheating process.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is an operational diagram in which temperature is plotted against heat exchange as far as operation of the heat exchanger is concerned.

Figure 1:
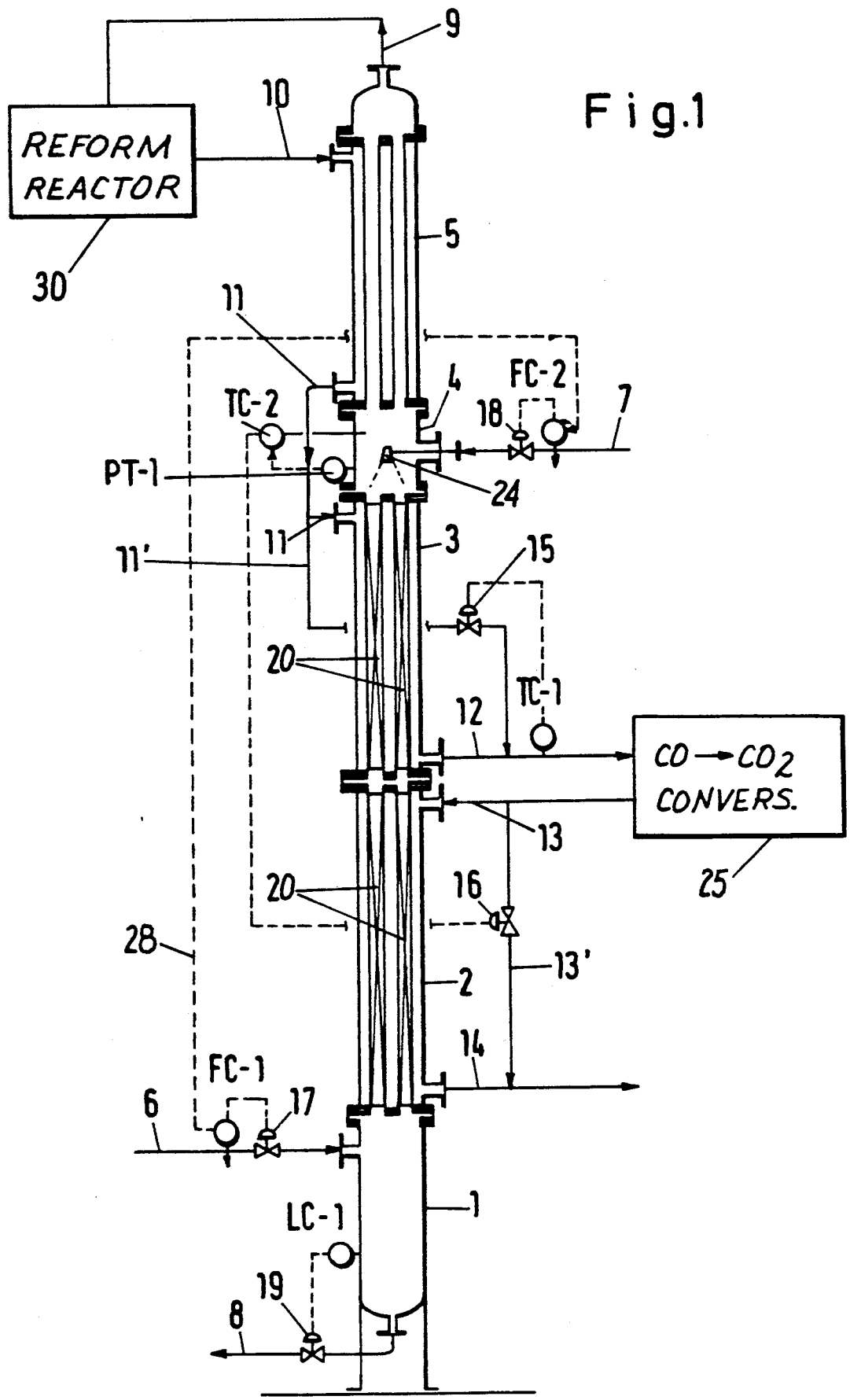
FIG. 1 is a somewhat schematic illustration of a heat exchanger constructed in accordance with the preferred embodiment of the present invention for practicing the best mode thereof including practicing the inventive method under best mode considerations.

Proceeding now to the detailed description of the drawings the heat exchanger shown in FIG. 1 is basically constructed to establish five zones which are interconnected directly with each other in a series that is arranged in a vertical configuration. They are the zones 1, 2, 3, 4 and 5. However, zones 2 and 3 are equivalent; they are suggested only because of additional use of available enthalpy.

The base zone is in the physical configuration of a heat exchanger and is established by a precipitator 1 in which a discharge slurry of water is collected that has not yet evaporated. Conduit 8 is provided for the discharge of the slurry. The upper part of the precipitator 1 is fed with gaseous hydrocarbons e.g. methane. Reference numeral 6 refers to a supply line leading from a suitable source and by means of which the hydrocarbon such as methane is fed into the upper zone of the precipitator 1. In the essence, the precipitator removes water from the methane steam mixture that is formed in the upper part of the equipment.

A heat exchange zone 2 is provided on top of the precipitator 1. That zone 2 is basically established through vertically running heat exchanger tubes wherein the hydrocarbons are preheated and can be saturated with steam in that the interior of the heat exchanger tube respective vapors and gases are ascending. Water is sprayed into the system above the zone 2 and into the heat exchanger tubes. This water flows down and thus there is a counterflow of water that flows down and hydrocarbon mixed with steam that flows up. Note that there is no flow space separation through any partitioning that separates the water from the hydrocarbon-steam mixture.

Hence, the heat exchange between hydrocarbons and whatever water vapor is being produced on the blend which is brought to a heat exchange relationship with a heat medium which in turn is fed into the jacket of the zone 2 through a conduit 13 and discharged through a conduit 14. This heating medium remains physically separated from the water and the hydrocarbon-steam mixture but heats both, primarily however the water that flows down along the tube walls. Heating process proper results in a counterflow operation. In the interior of the heat exchanger tubes there is a filling 20 provided with Raschig rings and other similar materials in order to increase the area of contact between the gaseous hydrocarbons on one hand and the degassed injected steam on the other hand. This in turn favors the evaporation of the water.

A significant advantage in the simultaneous production of steam and the formation of the hydrocarbon-steam blend is to be seen in that the steam is produced at a lower temperature than would be necessary if produced separately.

A medium or intermediate heat exchange 3 is arranged directly above zone 2 and being similarly constructed. Herein the gaseous hydrocarbons are heated further and are caused to saturate with steam until the desired steam concentration has been reached. Zone 3 uses as a separated heating medium the reform product itself which is fed for that purpose into the jacket of zone 3 through a conduit 11 and discharged therethrough from and through conduit 12. From there the reform product is fed to a CO converter 25. Analogously to the arrangement and provisions related to the heat exchanger tube in zone 3 the heat exchanger tubes in zones 3 are provided with Raschig rings of similar material in order to enhance evaporation of water. If no CO conversion is provided for, the two zones 2 and 3 can be combined in a single heat exchanger zone.

A water spray chamber 4 is provided on top of zone 3 into which the water needed for evaporation is sprayed by means of nozzles 24. For this, a conduit 7 feeds the plurality of nozzles 24 with degased water. The sprayed in water can flow into the heat exchanger tubes, first of zone 2 and then of zone 3.

On top of the spray chamber 4 an upper heat exchange zone 5 is provided wherein the hydrocarbon-steam blend or mixture rises further. This mixture of course was produced in zones 2 and 3 and is also caused to flow through the water spray chamber 4. From there it reaches the heat exchanger of zone 5. The blend and mixture is now heated further in zone 5 through heat exchange also in counterflow method but now under utilization of the reformed product which is fed into the zone 5 through the conduit 10 and discharged therefrom through conduit 11. Conduit 11 thus performs a dual function; it is an inlet for the reform product when used as heating medium in zone 3, an outlet when so used in zone 5.

At the upper end of zone 5 the hydrocarbon-steam blend and mixture is extracted, and it is assumed that the mixture has the desired temperature needed for preheating before being charged in the reaction chamber 30 of the reforming device, conduit 9 provides for this connection.

The amount of gaseous hydrocarbon fed from below in the heat exchanger as a whole is determined and subject to quantitative control through a controller FC-1. This controller acts on a control valve 17 in the conduit 6. The amount of degassed water fed into the system is controlled through a quantitative controller FC-2. This controller acts on the control valve 18 in line 7. The FC-1 controller also affects the adjustment of the reference or desired value within the controller and regulator FC-2 as indicated by the dotted line 28 in order to provide for the requisite follow-up control. Thus in the case of quantitative changes in the feeding of hydrocarbon one can maintain a constant ratio between hydrocarbon and water (steam). In principle, the slaving can run the other way, whatever may vary more likely will control.

The system and heat exchanger disclosed assumes the presence of a CO converter and the temperature needed for the CO conversion is controlled through a controller TC1. This controller acts on a valve 15 in a bypass conduit 11' which branches reform product from line 11 and if necessary causes certain portion of the reform product to be fed directly into the conduit 12 of the CO converter thereby bypassing zone 3 and lessening the amount of heating.

The steam concentration within the hydrocarbon-steam blend and mixture which is to be used in the reformer reactor 30 is controlled through the temperature controller TC2. This obtains in that the saturation temperature of the hydrocarbon-steam blend and mixture on exiting from the medium zone of the exchanger, is maintained at a particular value and level. For this the amount of heating medium, which is a CO conversion product flowing through zone 2 is adjusted accordingly whereby specifically the CO conversion product amount is controlled in between the feeder line 13 and the discharge 14 involving a bypass 13' which selectively bypasses the zone 2 or not there being a control valve 16 provided for this purpose.

The desired value for the temperature controller TC2 is established originally empirically but has to be compensated in order to consider changes in the saturation temperature. The changes occur on variations in the operating pressure being fed as a signal through the pressure transmitter PT-1. This pressure transmitter PT-1 is connected to and receives an input from the chamber 4 i.e. it monitors the pressure of and in that chamber. The precipitator 1 is provided with a level or state of filling controller LC1 acting on the control valve 19 of the slurry discharge line 8 to speed up or retard the discharge.

Table 1 shows figures which constitute process parameters for the heat recovery in a particular example and refers to the device shown in FIG. 1. FIG. 2 shows for that specific example the temperature as it obtains in and through the various media as they pass through the various heat exchanger zones as indicated. Specifically the reform product arrives at a temperature of 660 degrees C. and flows from duct 10 into the upper part of zone 5 to serve as heating medium. Accordingly it is being cooled down in zone 5 and zone 3 through the heat exchange process and has a temperature of about 350° C. when it reaches exit and discharge line 12 of the middle zone 3.

The reform product has this temperature of 350 degrees C. as it is fed via duct 12 to the CO converting equipment 25 and is heated therein to a temperature of about 412 degrees C. That is of course the entrance temperature of the conversion produced at the inlet (line 13) for zone 2. The CO conversion product is cooled in the zone 2 continuously until reaching about 150 degrees C. In the lower part of zone 2 there is only a relatively weak cooling by a few degrees C. The heating of the reform charge in the lower part of heat exchange zone 2 is quite significant (lower curve). Essentially what is involved is the heating of the methane gas. This gas is fed to the equipment 30 at a temperature of about 40 degrees C. For heating this gas one needs only, relatively speaking, low quantities in thermal energy. With an increase in level in the heat exchanger the rate of temperature increase goes down because the exchange heat and thermal energy extracted are needed primarily for the evaporation of water. The temperature in the upper part of heat exchanger zone 3 is about 190 degrees C. Further temperature increase in the upper heat exchanger 5 is again somewhat steeper because no evaporation is extracted from the process. Hence the hydrocarbon-steam mixture for use as charge in the reformer as described will have a final temperature of about 270 degrees C.

The inventive method as well as the inventive process and heat exchanger offer the following advantage.

The multiple and differently configured heat exchangers as per the state of the art are combined in a single heat exchanger for (i) steam production (ii) preheating the hydrocarbon as well as (iii) the hydrocarbon-steam blend for obtaining a charge with minimal expenditure in energy. Accordingly complicated connections between different heat exchangers is not necessary which in addition saves also space as well as investment cost.

The steam is produced at a lower temperature as was used before and this means that one can use more efficiently waste heat at a lower temperature level.

Larger quantities in heat can be reclaimed from the reformed product possibly also for the CO conversion product if there is a CO conversion taking place. All this of course increases the efficiency of the heat production generally and the heat recuperation in particular.

Larger quantities and slurries can be processed as was possible before, without interfering with the thermal efficiency of steam production because the heat content of the slurry is used likewise. As an interesting side effect the water usable can be of a fairly low quality as compared with water needed otherwise for the production of steam.

TABLE 1

| Gaseous hydrocarbon charge: | $CH_4$ | 100.00 kmol/h |
|---|---|---|
| | Temperature | 40° C. |
| | Pressure | 18.0 bar |
| Water: | $H_2O$ | 341.25 kmol/h |
| | Temperature | 189° C. |

TABLE 1-continued

| Reformer-Product as charge into heat exchange zone 5: | Pressure | 17.9 bar |
|---|---|---|
| | $CH_4$ | 18.40 kmol/h |
| | $CO_2$ | 33.65 kmol/h |
| | CO | 47.95 kmol/h |
| | $H_2$ | 278.45 kmol/h |
| | $H_2O$ | 209.75 kmol/h |
| | Temperature | 660° C. |
| | Pressure | 16.8 bar |
| CO-Conversion Product prior to charge into heat exchange zone 2: | $CH_4$ | 18.40 kmol/h |
| | $CO_2$ | 66.88 kmol/h |
| | CO | 14.72 kmol/h |
| | $H_2$ | 311.68 kmol/h |
| | $H_2O$ | 176.52 kmol/h |
| | Temperature | 412° C. |
| | Pressure | 16.5 bar |
| Preheated blend as charge for reforming process: | $CH_4$ | 100.00 kmol/h |
| | $H_2O$ | 325.00 kmol/h |
| | Temperature | 207° C. |
| | Pressure | 18.0 bar |
| Slurry in precipitation 1: | $H_2O$ | 16.25 kmol/h |
| | Temperature | 40° C. |
| | Pressure | 18.0 bar |
| Heat exchange: | upper zone 5 | 1560000 kcal/h |
| | middle zone 3 | 1420000 kcal/h |
| | lower zone 2 | 130000 kcal/h |
| | total | 3110000 kcal/h |

The invention is not limited to the embodiments described above but all changes and modifications thereof, not constituting departures from the spirit and scope of the invention, are intended to be included.

I claim:

1. Method for the continuous production and preheating of a gaseous hydrocarbon and steam blend as a charge for a reforming process for the production of hydrogen or synthesis gas as a reforming product comprising the steps of:

using a single heat exchanger for (i) indirectly preheating the gaseous hydrocarbon, and including (ii) spraying water into a zone of preheating of the gaseous hydrocarbon so that the water evaporates in direct contact with the preheated gaseous hydrocarbon while simultaneously (iii) a blend of the gaseous hydrocarbon and of the steam obtains, and (iv) continuing heating the gaseous hydrocarbon and steam blend; the hydrocarbon water and steam being and remaining physically separated from a heating medium in the heat exchanger; and extracting the preheated gaseous hydrocarbon and steam from the heat exchanger, to be used as the charge for the reforming process.

2. Method as in claim 1 providing counterflow of hydrocarbon and water.

3. Method as in claim 1 wherein the water descends on account of gravity and the heating medium flows up.

4. Method as in claim 1 including the step of pressurizing the hydrocarbon-steam mixture for passages through the heat exchanger.

5. Method as in claim 1 heating the water prior to spraying at a temperature in excess of 100° C.

6. Method as in claim 5, spraying the water at a pressure in excess of 15 bar and at a temperature in excess of 150 degrees C.

7. Method as in claim 1 wherein the amount of water sprayed in is larger than needed for evaporation further including the step of collecting the excess water and discharging it together with impurities at a temperature below 50 degrees C. from the heat exchanger.

8. Method as in claim 1 including utilization of the reforming product as heating medium in the heat exchanger.

9. Method as in claim 8 wherein the reforming product, following utilization as heating medium in the heat exchanger, is fed to a CO-to-$CO_2$ conversion stage for being reheated therein.

10. Method of continuous production and preheating of a gaseous hydrocarbon and steam charge comprising the steps of:

spraying pressurized water directly into a spray zone of a rising flow of gaseous hydrocarbon, to obtain evaporation of descending water;

heating the flow of gaseous hydrocarbon, steam and water through a heat exchange process, in which a heating medium is kept separate from the said flow, but in a zone below said spray zone; and additionally heating the rising gaseous hydrocarbon steam mixture above said spray zone for the spraying of water.

11. Method as in claim 1, including the step of controlling the amount of spray water in dependence upon the gas flow of hydrocarbon.

12. Method as in claim 1, including thereof controlling the heat exchange in dependence upon pressure and temperature of the spray water.

* * * * *